2 Sheets—Sheet 1.

E. SMITH.

BASE-BURNING STOVES WITH CENTRAL AIR-PASSAGE.

No. 6,889. Reissued Feb. 1, 1876.

Witnesses:
Chas Thurman
W. E. Chaffee

Inventor:
Elihu Smith
by his Atty
Thos. D. Sprague

N. PETERS, PHOTO-LITHOGRAPHER, WASHINGTON, D. C.

E. SMITH.

BASE-BURNING STOVES WITH CENTRAL AIR-PASSAGE.

No. 6,889. Reissued Feb. 1, 1876.

Witnesses:
Chas. Thurman.
W. E. Chaffee

Inventor:
Elihu Smith
by his atty
Ph. C. Sprague.

N. PETERS, PHOTO-LITHOGRAPHER, WASHINGTON, D. C.

UNITED STATES PATENT OFFICE.

ELIHU SMITH, OF ALBANY, NEW YORK, ASSIGNOR, BY MESNE ASSIGNMENTS, TO SAMUEL H. RANSOM, TRUSTEE.

IMPROVEMENT IN BASE-BURNING STOVES WITH CENTRAL AIR-PASSAGES.

Specification forming part of Letters Patent No. 126,840, dated May 14, 1872; reissue No. 6,889, dated February 1, 1876; application filed October 27, 1875.

*To all whom it may concern:*

Be it known that I, ELIHU SMITH, of the city and county of Albany, and State of New York, have invented an Improvement in Heating-Stoves, of which the following is a specification:

The object of the present invention is to construct a heating-stove in such a manner that it will thoroughly consume the fuel, be efficient as a radiator of heat, readily manipulated in all the processes of filling, cleaning, and regulating, and, in operation, present a beautiful and attractive appearance; and to this end it consists in devising and arranging pipes or openings into the bottom, and upward in the body of the stove, and likewise pipes downward through the top and fuel-reservoir, so that either or both may be used independently, or be joined together and used as a single system, and in combining with the lower part of the stove a deflector, and in the construction and arrangement of the fire-bed openings through the wall of the stove, illuminated openings, and incased escape-flues and dampers, so that the process of combustion will be displayed, the fire-bed can be readily manipulated or cleared, and the flow of the products of combustion so arranged or regulated as to afford the most effective heating capacity, and in the general constitution and combination of the stove, whereby an efficient and beautiful device can be constructed, which can be used individually or in combination with other heaters, above or below, or both.

Figure 1:
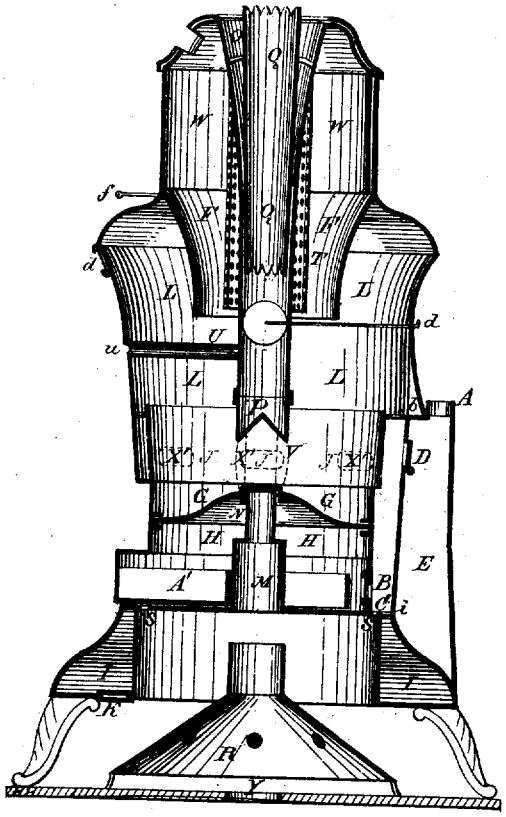
Figure 2:
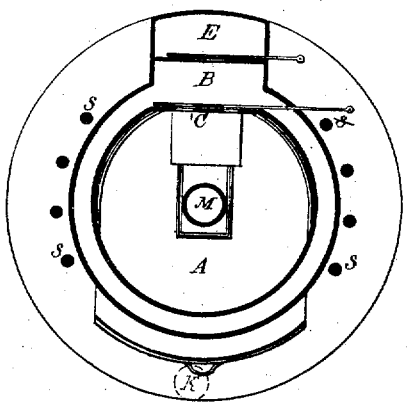
Figure 3:
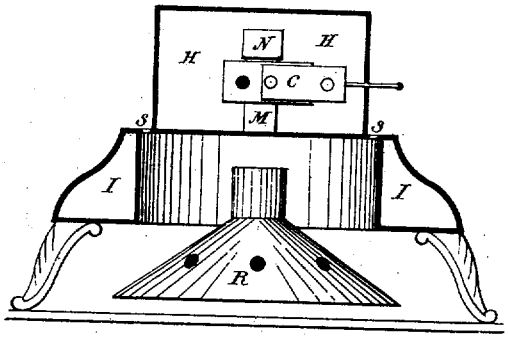
Figure 4:
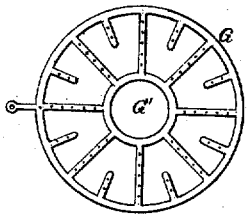
Figure 5:
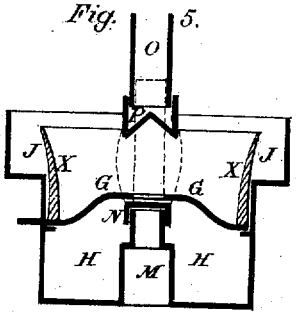
Figure 6:
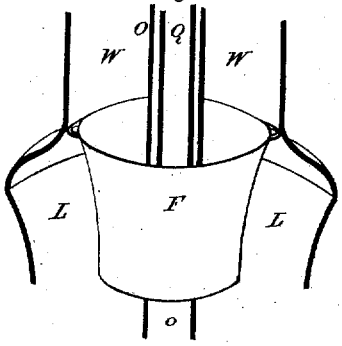
Figure 8:
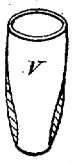
Figure 7:
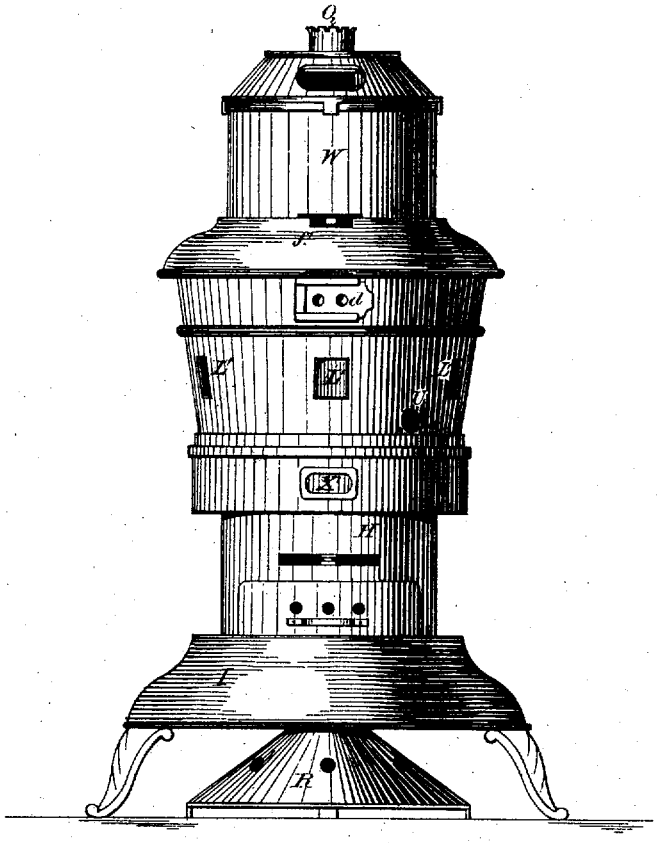

In the accompanying drawings, Figure 1 is a vertical section, from front to rear, showing rear incased flues, and the fire-bed supported between two rings, the upper one being designed to prevent coal from wedging between the periphery of the fire-bed and the walls of the stove, when no lining is used within the fire-pot, and to sustain such lining when used, and the lower one being stationary, and designed to support the fire-bed. Fig. 2 is a horizontal section. Fig. 3 is a vertical section of the base, detached. Fig. 4 is a plan view of the fire-bed. Fig. 5 is a vertical section of that portion of the stove which contains the fire-pot and ash-pit, and showing the fire-bed supported on the stationary ring, and the fire-pot provided with a lining. Fig. 6 is a vertical section, showing the magazine in perspective. Fig. 7 is a front elevation of the stove. Fig. 8 is a sectional representation of the loricated flue.

In the base, and below the plane of the ash-pit H, is an annular flue, I, communicating, by aperture *i*, with the vertical descending incased rear flue B. The products of combustion escaping from the combustion-chamber L can pass directly down through the opening *b* into said flue B, or into and through the horizontal passage or gas-ring J, around the fire-pot, and thence into said flue B, and from said flue the products of combustion escape into the annular base-flue I, and thence into the lower end of the incased ascending rear flue E, and thence pass to the exit-pipe A.

By opening the damper D a direct draft from the fire-chamber may be had. Between the flue B and the ash-pit H is a damper, C, which can be used to regulate the draft, or to allow the escape of dust.

It will be observed that in the described flow of the currents of combustion along the downward flue B they impinge against the partition which separates said flue B from the ascending flue E, the result of which is that the flue E becomes greatly heated, and the ascending currents of the products of combustion passing through it are accelerated to a great degree, thereby causing a perfect and thorough draft of the stove when in operation, and adding largely to its effectiveness. This result could not be accomplished where the rear ascending flue is separated from the body of the stove, and exposed on all sides to the influence of the temperature of the room, and is possible where both of the flues are incased by a shell forming a part of the body of the stove.

From the top of the space formed in the base by the annular chamber I the pipe M extends centrally up through the ash-pit (the ash-pan A′ being made of such shape as to fit about it) into a proper central opening, G′, in the center of the fire-bed. The top of this pipe M is covered by the detachable cap N.

While the deflector R, in shape like an inverted tunnel, beneath the stove, serves to protect the floor from burning or disfiguration by heat, it causes a flow of cold air, which is heated in its passage through its contracted top, upward into the pipe M, and by these means there is established a circulation of such heated air into and through the center of the fire-bed, and into the center of the incandescent coal. Likewise, the heat radiated from the interior surface of the flue I materially aids in the same object. By the perforations *s s* in the upper edges of the chamber in the base the heat may, in a considerable measure, be diffused directly into the room. Fresh air can be admitted, if desired, at the openings Y in the floor. From the aperture K connection can be had with a heater in an adjoining or lower room, and this stove used as a drum or auxiliary heater. Generally, however, this aperture is closed by a suitable plate.

The top part of the stove, at W, forms the upper section of the fuel-magazine, the lower section F of which depends into the combustion-chamber L. This lower section is supported upon the upper edge of the fire-chamber section in such a manner as to be readily vibrated by a handle, which projects through a slot in the stove-casing at *f*. By this means this part of the magazine may be agitated, and its contents shaken down, when, for any purpose, it becomes necessary to do so, and in this way the fuel can be readily fed down upon the fire, and all difficulty of bridging or choking be effectually obviated.

A flaring tube, O, is suspended from an opening in the top of the stove through the magazine and combustion-chamber, to and within the fire-pot, its lower end being closed by a removable cap, P. Within this pipe is a short one, Q, of less diameter, through which the air, heated in its passage down between the two tubes, ascends into the room, the pipe Q being open at both ends. That portion of the pipe O passing through the sections W F of the magazine is encircled by a perforated tube, T, to prevent the ignition of the fuel, which might result from the direct contact with the hot surface of the tube O. A lateral flue, *u*, conducts cold air through the combustion-chamber into the pipe O. Cold air may also be introduced directly into the combustion-chamber by opening the damper *d*, which may be of the form shown, or may entirely surround that portion of the casing of the stove, controlling a circular series of holes therein. V is a loricated pipe, which is used to connect the lower end of the pipe O with the upper end of the pipe M, the caps N and P being first removed, for the purpose of forming a continuous air-flue through the body of the stove from top to bottom, the pipe O being provided with a suitable damper to control the circulation through such continuous air-flue.

The loricated pipe, the cap P, and the pipe Q are removable, so that the stove may be made and used with or without them.

The grate G is made concave in form, its central portion being the highest, while its periphery is suitably sustained and supported upon the stationary ring Z, projecting inwardly from the inner walls of the ash-chamber section in any convenient way. It can be moved to and fro by means of the handle *g*, which passes through a slot or opening, *g′*, in the walls of the stove, and of convenient size or shape to admit a poker or shaker, when it is desired to agitate the fire-bed.

In the walls of the combustion-chamber are illuminated openings, L′, suitably provided with mica, in any ordinary way, and there is a row of similar mica-covered windows, X′, below and opening into the wall of the stove surrounding the section in which the fire-pot is supported. These mica-covered openings add greatly to the attractive appearance of the stove when in use, being illuminated by the burning products of combustion.

What I claim as my invention, and desire to secure by Letters Patent, is—

1. With the base of a stove, the pipe M, provided with removable cap, extending up through the ash-pit to the fire-bed, substantially as and for the purposes specified.

2. A funnel-shaped deflector, R, pipe M, and recessed base, combined substantially as and for the purposes set forth.

3. In a heating-stove provided with a recessed base and annular flue, I, the deflector R, to deflect the heat radiated from the interior and lower surfaces of said flue into the room, substantially as described.

4. The centrally-perforated fire-bed G and loricated tube V, in combination with the open-ended pipes or flues M and O, substantially as and for the purposes specified.

5. The combination of the suspended air-pipes O and Q, substantially as and for the purposes set forth.

6. The perforated jacket or tube T, in combination with the air-pipe O, substantially as and for the purpose described.

7. The damper C, in combination with a vertical flue or flues and a base-flue, substantially as and for the purposes specified.

8. In a heating-stove, the combination of the contiguous ascending and descending rear flues, connecting base-flues entirely below the ash-pit chamber, a concave or disk-shaped grate, an illuminated flue, J, the dampers C and D, and the exit A, combined to operate substantially as and for the purposes set forth.

9. In a heating-stove, the combination of a descending incased rear flue, opening directly into the bottom of the combustion-chamber, adapted to prevent the products of combustion from rising above the bottom of the magazine, and an incased ascending flue in rear of the first-named flue, and of equal length therewith, and separated in its whole length from it by a partition only, substantially as and for the purposes described.

10. In a heating-stove, the combination of contiguous ascending and descending flues in the rear, inclosed within the shell of the stove, and connecting flues in the base of the stove, entirely below the ash-pit chamber, substantially as described.

11. In a heating-stove, the combination of the dampers C and D and the exit-pipe, for the purpose of providing a direct passage for the escape of dust from the ash-pan chamber to the exit, substantially as described.

12. A conical or disk-shaped grate, G, provided with orifice G′ in the center thereof, adapted to admit a flow of air to the center of the incandescent fuel, in combination with pipe M, provided with removable cap N.

13. In a heating-stove, and in combination with rear incased revertible flues, the illuminated gas-flue, placed between the base of the combustion-chamber proper and the lower end of the fire-pot.

ELIHU SMITH.

Witnesses:
B. BURTON,
S. P. SANFORD.